Aug. 4, 1953  S. A. GRUBICH  2,647,319
PIPE JOINT INTERSECTOR
Filed Jan. 30, 1950  8 Sheets-Sheet 1

FIG. I.

INVENTOR.
STEPHAN A. GRUBICH
BY
ATTORNEYS

FIG. 2.

INVENTOR.
STEPHAN A. GRUBICH

Aug. 4, 1953  S. A. GRUBICH  2,647,319
PIPE JOINT INTERSECTOR

Filed Jan. 30, 1950  8 Sheets-Sheet 3

FIG. 3.

INVENTOR.
STEPHAN A. GRUBICH
BY
ATTORNEYS

Aug. 4, 1953  S. A. GRUBICH  2,647,319
PIPE JOINT INTERSECTOR
Filed Jan. 30, 1950  8 Sheets-Sheet 4

FIG. 4.

INVENTOR.
STEPHAN A. GRUBICH
BY
ATTORNEYS

Aug. 4, 1953

S. A. GRUBICH 2,647,319

PIPE JOINT INTERSECTOR

Filed Jan. 30, 1950

*INVENTOR.*
STEPHAN A. GRUBICH
BY

ATTORNEYS

Aug. 4, 1953 S. A. GRUBICH 2,647,319
PIPE JOINT INTERSECTOR
Filed Jan. 30, 1950 8 Sheets-Sheet 6

INVENTOR.
STEPHAN A. GRUBICH
BY
ATTORNEYS

Aug. 4, 1953          S. A. GRUBICH                2,647,319
                     PIPE JOINT INTERSECTOR
Filed Jan. 30, 1950                         8 Sheets-Sheet 7

INVENTOR.
STEPHAN A. GRUBICH
BY
ATTORNEYS

Aug. 4, 1953 S. A. GRUBICH 2,647,319
PIPE JOINT INTERSECTOR

Filed Jan. 30, 1950 8 Sheets-Sheet 8

*INVENTOR.*
STEPHAN A. GRUBICH
BY

ATTORNEYS

Patented Aug. 4, 1953

2,647,319

UNITED STATES PATENT OFFICE 2,647,319

PIPE JOINT INTERSECTOR

Stephan A. Grubich, Philadelphia, Pa.

Application January 30, 1950, Serial No. 141,281

6 Claims. (Cl. 33—21)

This invention relates to an apparatus for flame cutting pipe joints of various sizes and angles of intersection in any combination of sizes or angles with the center lines in the same plane or on an offset plane. This apparatus provides a cutting torch above the pipe to be cut which is rotated under it and mounted on a movable carriage which is actuated by a developing mechanism to cut the curve of intersection. Another torch may be mounted also substantially above the pipe to be cut, and is adjustably carried by the main frame so as to remain motionless during the cutting operation while the pipe is rotated to produce a straight beveled cut off of the pipe. The two torches can be operated simultaneously or independently to produce a single intersection cut or an intersection cut and a straight bevel cutoff to complete a joint in one operation.

An object of the invention is to provide machine means for the intersection development and flame cutting of pipe intersections and effect a fast, smooth and perfectly cut and beveled joint in one operation for better welding of the pipe joint.

Another object is to provide two torches with a beveling tip on each, facing in opposite directions so as to provide means for making two cuts simultaneously, either two straight beveled cutoffs or one intersection cut and one beveled cutoff.

Another object is to locate the torches substantially above the pipe and rotate the pipe during the cutting operation so the torches are blowing substantially downward during cutting to permit natural flow of molten metal away from the cut so that the torches are not required to blow through any slag formation. This feature provides for a much smoother and cleaner cut off requiring no hand labor to remove slag deposits from the finished pipe joint.

Another object of the invention is to arrange the apparatus in such a manner so the unit is self-contained carrying its own oxygen and acetylene tanks and equipped with pneumatic or solid rubber tired wheels and a drawbar so it can be moved around on a location job or towed by vehicle to a field job.

Another object is to provide a three jaw self-centering chuck for gripping the pipe during rotation leaving the space on both sides of the chuck free from obstructions to permit easy handling of pipe into the machine.

Another object is to locate the torches away from the machine so slag and dirt is dropped to the ground instead of blowing into the machine and fouling up the developing mechanism which must be kept dirt free to function smoothly.

Another object is to provide a developing mechanism extremely simple to operate requiring no special technical knowledge to set the machine for various joints.

Another object is to provide a developing mechanism which can be set quickly to cut a different joint of different sized pipe on each cut without the use of cams or templates and with no loss of time.

Other objects and advantages of the invention will appear in the following description when read in conjunction with the drawings in which.

In the description, the end of the machine containing the drawbar will be considered the front. The opposite end which contains a chuck and torches will be termed the rear. The vertical will be termed as perpendicular to the ground or line connecting bottom of wheels. The horizontal will be a plane parallel to the ground line or line connecting the bottom of the wheels.

The apparatus consists of a main body 1 in the form of a carrier mounted on three wheels 2 with one front wheel arranged to steer with drawbar 3 attached. The carrier is arranged to receive one oxygen tank 4 and one acetylene tank 5 which are carried horizontally within the carrier. The acetylene and oxygen tanks are fitted with pressure gauges 6 in the conventional manner with a Y connection 7 on the outlet of each to permit connection of two sets of hoses 8 to each gauge to operate the moving torch 9 and the stationary torch 10.

Figure 7:
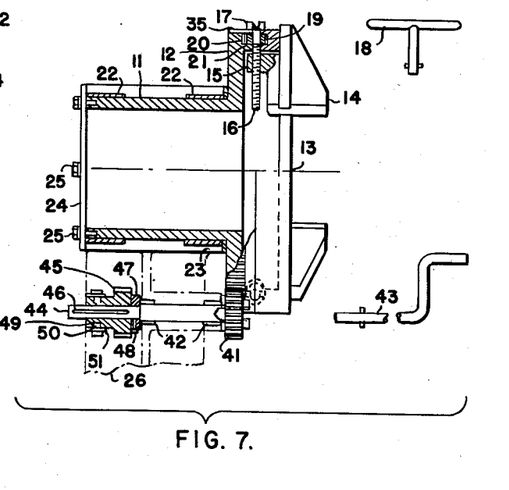
Figure 7 is a sectional and fragmentary enlarged view of the chuck and idler gear assembly as would appear in a plan view of Figure 2.

The pipe to be cut is gripped by a self-centering chuck 11, Figure 7, which consists of a split body the bearing member being 12 and the face member 13, on which three jaws 14 are slidably mounted with a projection 15 on each jaw threaded to receive adjusting screws 16. The three adjusting screws 16 are equally spaced on periphery of chuck 11 and their ends 17 are arranged to receive chuck wrench 18. The adjusting screws 16 are journalled half in chuck body 12 and half in face member 13 and are retained in position when 12 and 13 are bolted together in assembly so that pinion gear portion 19 of screw 16 engages the ring gear 20 which is actuated by any of the screws 16 to rotate the ring gear in circular groove 21 of member 12 to impart the same relative rotation to all three screws and therefore a synchronized motion of all three chuck jaws 14.

Figure 2:
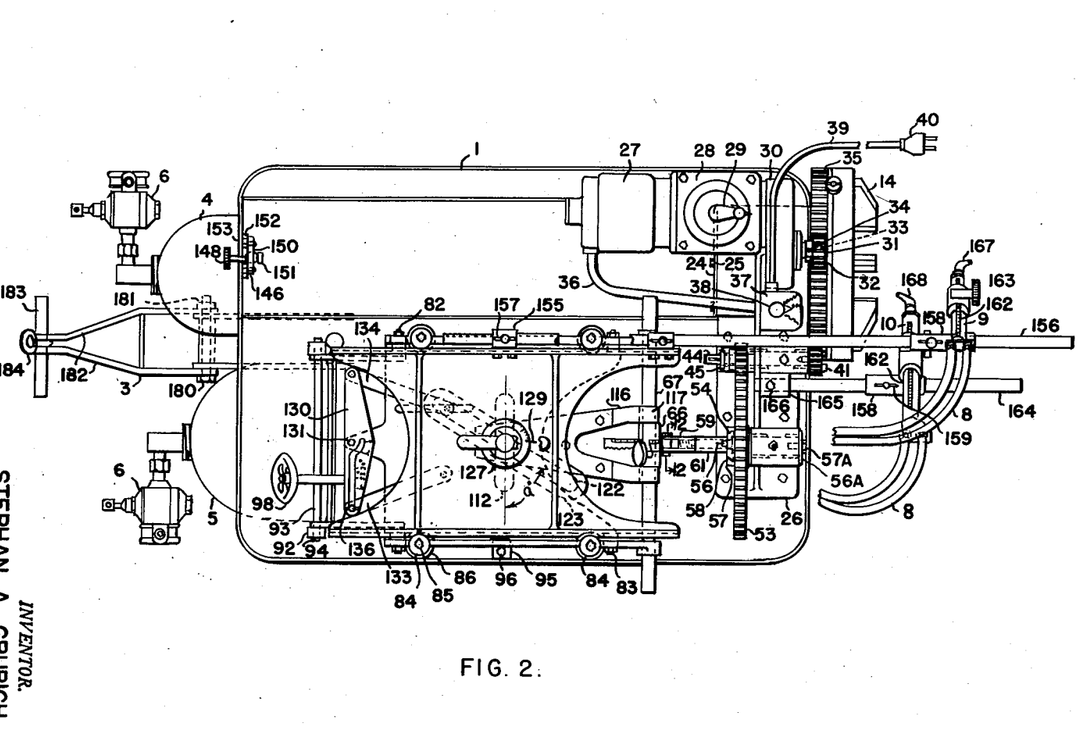
Figure 2 is a plan view complete with gas tanks in place but with hoses broken so as to permit better view of the developing mechanism.

The chuck 11 is held rotatably on two bronze bearings 22 and thrust collar 23 between the chuck and support casting 26 and has a retaining collar 24 with capscrews 25. Support casting 26 provides a supporting means for the chuck and all gears including the power unit. Referring now to Figure 2 the power unit comprises a 110 volt electric motor 27, a variable speed drive 28 with speed adjustment knob 29 on top and speed reduction box 30 with output shaft 31 carrying drive gear 32 keyed to shaft 31 by means of key 33 and secured by means of set screw 34. Drive gear 32 meshes with gear teeth 35 cut in outer periphery of chuck body 12 to form driving means.

The motor 27 is controlled by wires 36 leading to reversing control box 37 with control knob 38 arranged to give the motor a directional rotation of forward or reverse and a stop position. Flexible cord 39 leads from control box 37 to standard electrical plug 40 which is used to plug into any 110 volt current available. Extension cords can be used to give the machine long reach on outside jobs.

Figure 8:
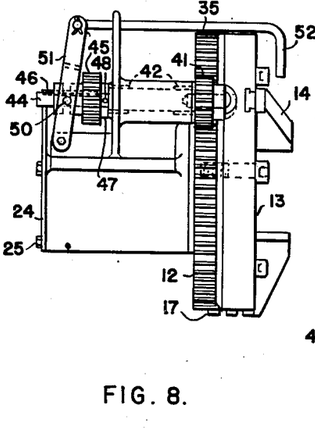
Figure 8 is a fragmentary view showing a side elevation the structure of Figure 7 disclosing gear clutch shifting means.

Also engaging gear teeth 35 on chuck body 12 is an idler gear 41 (Figures 7 and 8) supported by needle bearings 42 mounted in bored seats in support casting 26. The hub end of idler gear 41 is bored and slotted to receive hand crank 43 which is used to drive the mechanism when no electrical current is available. Idler gear 41 has an extended shaft end 44 which extends through the bearings to carry sliding gear 45 which is slidably mounted thereon and arranged to rotate with gear 41 by means of key 46. A collar 47 is spaced between gear 45 and support casting 26 and securely fastened to shaft end 44 of gear 41 by means of set screw 48 to retain entire assembly in position. Gear 45 has annular groove 49 to receive studs 50 on shifting fork 51 which is used to shift gear 45 into or out of engagement. Shifting forks 51 are manipulated by handle 52.

Figure 5:
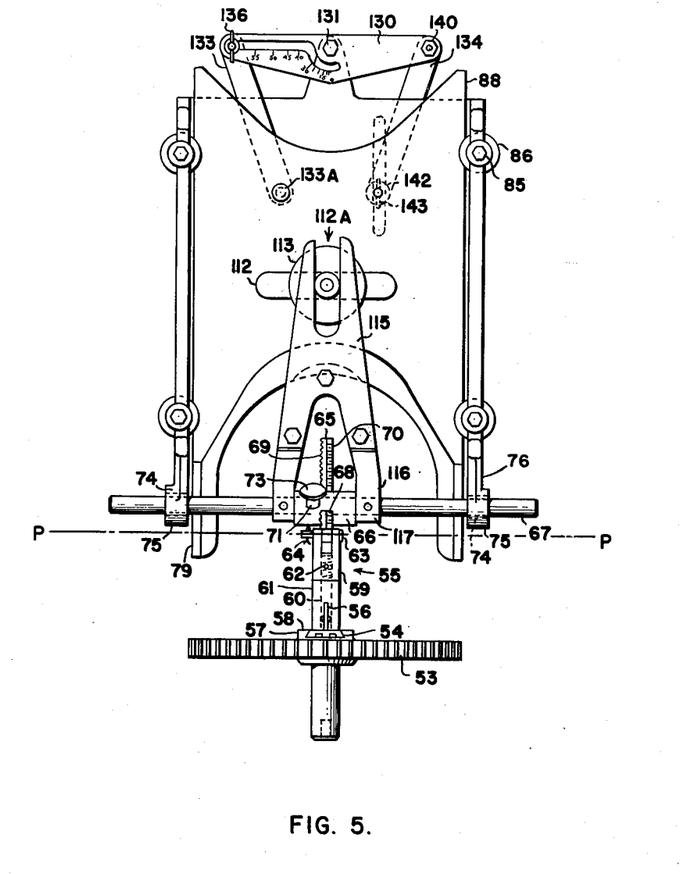
Figure 5 is an enlarged plan view of the development mechanism with the upper carriage removed to disclose more clearly the structure of the intermediate carriage and intermediate plate.
Figure 12:
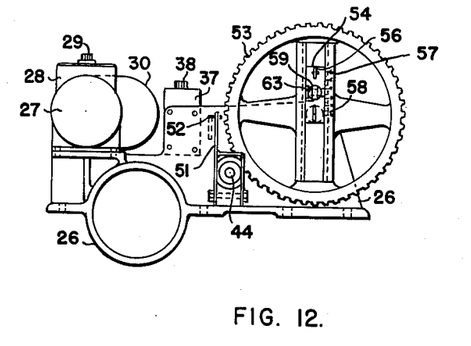
Figure 12 is a view looking toward the rear of the pipe cutting machine showing the association of the power unit, support casting and developing gear.

Sliding gear 45 engages developing gear 53 which is rotatably mounted in support casting 26 by means of two needle bearings. A thrust washer is spaced between gear 53 and casting 26 and a collar 56A is fastened to gear 53 by capscrew 57A to retain the gear 53 on casting 26. Gear 53 contains a grooved dovetail slide 54 (see Figure 12) to slidably and adjustably carry developing lever assembly 55 (see Figure 5) which is adjustable from the center out and retained in any desirable position by means of two thumb screws 56. Face 57 of developing gear 53 is marked with a scale 58 (see Figure 12) so the distance from the center line of developing lever 55 and the center of rotation of gear 53 can be read directly. Developing lever assembly 55 has a swivel end 59 and a shaft 60 having an enlarged end 60A swivelly engaged with dovetail slide 54. Shaft 60 is rotatably fit into shank 61 and is screwed to swivel end 59. The assembly is retained by staking swivel end 59 to shaft 60 by means of pin 62. Pin 63 holds developing link 65 into engagement with swivel end 59 and the square body of link 65 protrudes through a square opening 68 in sleeve 66 and cross shaft 67 (see Figure 5). One side of link 65 has ratchet teeth 69 cut along its entire length and a scale 70 is stamped on the top side to give distance from center of pin 63 to center of cross shaft 67 which distance is read directly at the point where link 65 meets the outer periphery of sleeve 66. Cotterpin 64 secures pin 63. Sleeve 66 has a stephole 66A bored adjacent the square hole and at right angle thereto as shown in Figure 5 to permit spur gear wrench 71 to engage ratchet teeth 69 while rotatably mounted in sleeve 66 and shaft 67. Wrench 71 protrudes through sleeve 66 and is threaded to receive wing nut 72 which is used to lock link 65 in any desired position. Wrench 71 is supplied with handwheel 73 at the opposite end and by rotating wrench 71 link 65 is slid in and out of sleeve 66 as desired.

Figure 6:
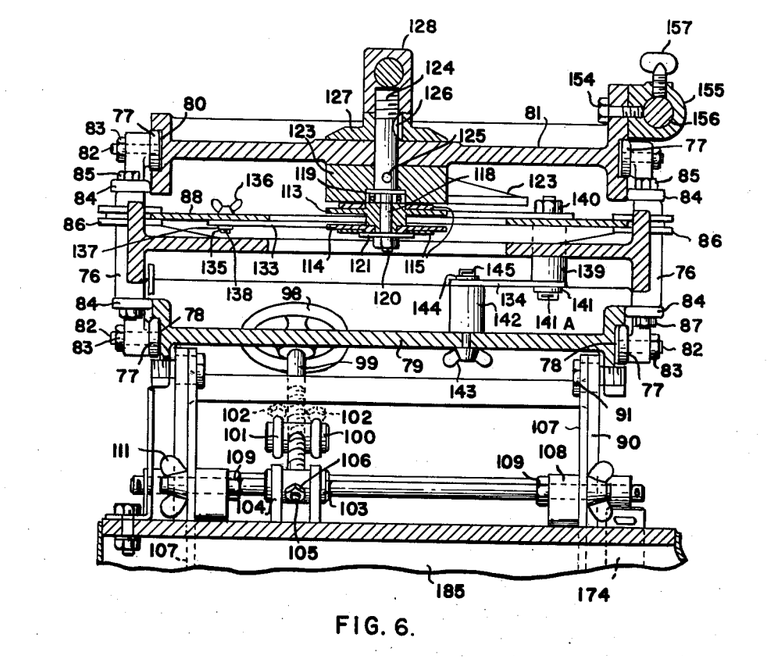
Figure 6 is an enlarged sectional view of the carriages and their associated elements as shown in Figure 4.
Figure 13:
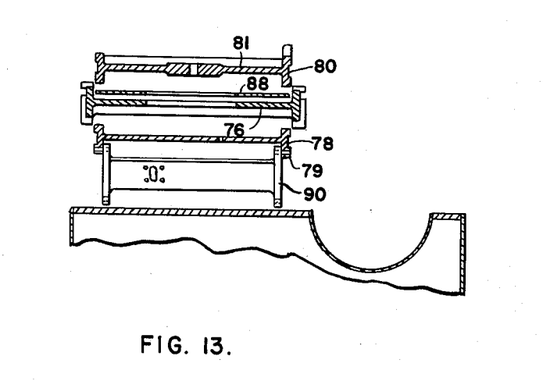
Figure 13 is an exploded view showing the carriages of Figure 4.
Figure 14:
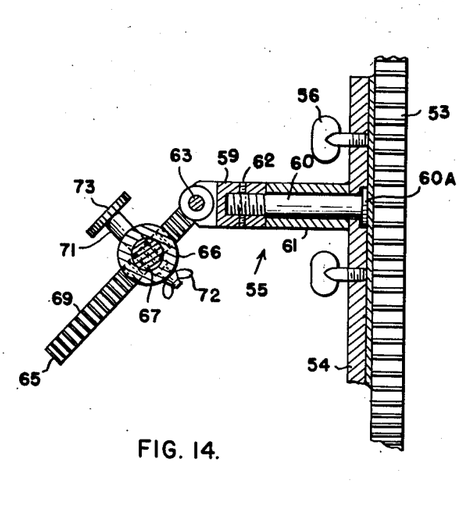
Figure 14 is a vertical section of the developing lever assembly and associated parts.
Figure 15:
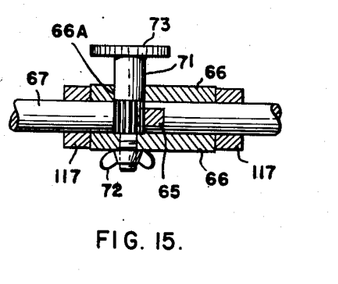
Figure 15 is a sectional view showing the coaction of the spur gear wrench and the developing link.

Cross shaft 67 extends through two bearings 74 in bosses 75 of intermediate carriage 76 (Figure 5). Carriage 76 has eight spaced rollers 77 disposed vertically to engage grooved track 78 of lower carriage 79 and grooved track 80 of upper carriage 81 (Figures 6 and 13). Rollers 77 are retained in track 78 by pins 82 and locked by nuts 83. Eight rollers 84 are also disposed horizontally on intermediate carriage 76 to guide movement of upper carriage 81 by contact with upper carriage 81 just below groove 80, and to guide intermediate carriage 76 in its relative movement to lower carriage 79 by contact just above groove 78. Rollers 84 are retained in contact with carriage 81 by four extended capscrews 85 which also pass through four spaced grooved rollers 86 disposed between each set of rollers 84 and rotatably mounted in four milled slots in carriage 76. Capscrews 85 are locked by locking nuts 87.

The four spaced grooved rollers 86 receive an elongated thin intermediate plate 88 and provide relatively friction free guides for reciprocating motion of intermediate plate 88 relative to intermediate carriage 76.

Figure 4:
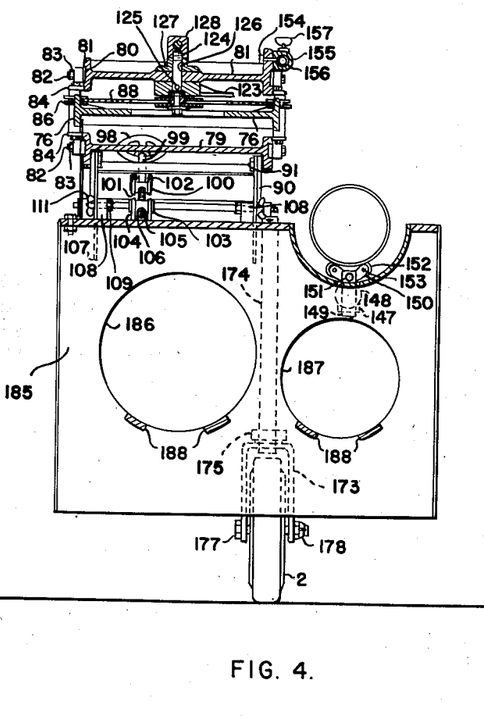
Figure 4 is a view taken on the plane indicated by the line 4—4 of Figure 1.

Lower carriage 79 is adjustably supported by a pair of webbed supporting brackets 89 and 90 (see Fig. 1) in parallel alignment fastened rotatably at their upper extremities to lower carriage 79 by threaded shoulder bolts 91 and at their lower extremities rotatably to four spaced lugs 92 on carrier 1 by means of two extended rods 93 secured by four cotter pins 94. Webbed brackets 89 and 90 are arranged to pivot about extended rods 93 to elevate lower carriage 79 in a level position, the distance of the elevation being indicated by a scale indicator 95 read from lower edge of grooved track 78 shown aligned at O in Figure 1. Indicator 95 is secured to the top of carrier 1 by capscrew 96 and nut 97. To raise lower carriage 79 hand wheel 98 is rotated clockwise imparting relative motion to acme screw 99 which passes through tapped trunnion 100, held free to oscillate against web of bracket 90 by two U bolts 101 and locking nuts 102 (see Figure 4). The end of screw 99 opposite handwheel 98 is shouldered to bear against another trunnion 103 (see Fig. 4) supported rotatably by ears 104 on top of carrier 1. A reduced diameter portion 105 of screw 99 passes through trunnion 103 and is threaded to receive locking nut 106 to secure the assembly.

Four spaced adjustable links 107 are rotatably fastened on shoulder bolts 91 at their upper ends and extended downward through the carrier top through elongated openings adjacent four lugs 108 drilled to receive bolts 109. Links 107 each has an elongated slot 110 in its lower portion to receive bolts 109. Wing nuts 111, in conjunction with bolts 109, are used to clamp links 107 securely against lugs 108. Wing nuts 111 are loosened when any adjustment is desired to be made in the elevation of lower carriage 79 and again tightened when the desired elevation of carriage 79 is reached.

As best shown in Figure 5, reciprocating plate 88 contains an elongated slot 112 at right angles to its guiding sides. A flanged guide roller 112A made up of an upper half 113 and a lower half 114 (see Figure 6) is assembled with a flange on each side of plate 88 and pressed into permanent assembly slidably and rotatably thereon.

Straddling flanges of roller 112A on both sides of plate 88 are spaced fork plates 115 of traversing fork assembly 116 the other ends of which have bored hubs 117 to receive cross shaft 67 which is free to rotate within the hubs 117. The inner faces of hubs 117 are closely fit to sleeve 66 to permit relative movement therewith along the axis of cross shaft 67 and so arranged that as link 65 is oscillated and moved to either side of the central position as shown in Figure 5 the traversing fork assembly imparts the same relative movement to the flanged roller 112A.

A pin 118 passes through flanged roller 112A and pressed onto one end is a ball bearing assembly 119 while the other end is threaded to receive locking nut 120 over a retainer washer 121.

Ball bearing 119 is located so as to roll in the confines of an elongated slot 122 of angle setting quadrant 123 (Figures 2 and 6). Quadrant 123 is bored to receive an upright stud 124 which is secured by staking pin 125. Stud 124 is milled to receive Woodruff key 126 which holds indicating dial 127 in exact alignment with setting quadrant 123 so that both move in unison. A clamping handle 128 is used to stay the quadrant 123 in any desired position by means of clamping action. Indicating dial 127 is marked in degrees as shown in Figure 2 and a stamped marker line 119 is stamped on upper carriage 81 so that the angle of quadrant 123 with its normal position can be read directly from the dial.

Figure 1:
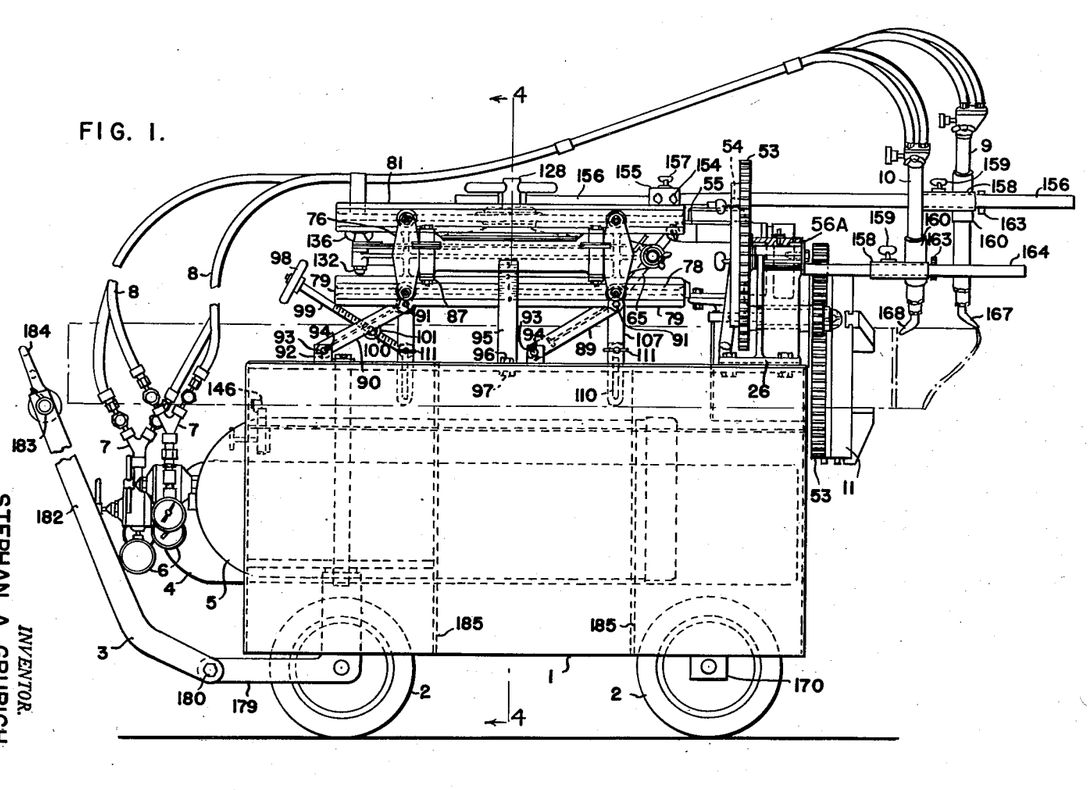
Figure 1 is a side elevation of the complete machine showing the pipe being cut in position in dot and dash lines and also showing a typical cut with one torch cutting a development cut and the other a straight beveled cutoff.

A multiplying lever 130 (Figs. 2, 5 and 6) is pivoted at its center by shoulder bolt 131 secured to a boss on intermediate carriage 76 by locking nut 132 (see Figure 1). The lever contains an elongated slot which is marked along one edge with degree marks, the purpose of which will be hereinafter described. Pivotally fastened to lever 130 at each end is a pair of links 133 and 134. Link 133 is adjustably and pivotally fastened to lever 130 by means of a shoulder screw 135 which is clamped to lever 130 in any desired setting along the slot by wing nut 136. Retaining the link 133 on screw 135 is a washer 137 and cotter pin 138. The other end of link 133 is riveted rotatably to intermediate sliding plate 88 at 133A. Link 134 is fastened to lever 130 by means of longer shoulder screw 139 and secured thereto by locking nut 140. The link 134 is secured to screw 139 by means of washer 141 and cotter pin 141A. The other end of link 134 is fastened rotatably and slidably to lower carriage 79 by means of shoulder screw 142 which is secured to carriage 79 by means of wing nut 143. Link 134 is rotatably secured to top of shoulder screw 142 by means of washer 144 and cotter pin 145.

A steady rest assembly 146 (Figs. 2 and 4) is provided to support any large overhanging pipe while cutting to relieve strain on the chuck. This rest consists of a bored block 147 which is welded integral with the carrier 1 and is provided with a tapped hole in one side to receive clamping screw 148. An adjusting post is slidably fitted in 147 and retained in any desirable position by clamping screw 148. The upper end of post 149 has a milled slot to slidably receive the equalizing yoke 150 which is secured to post 149 by capscrew 151. Two rollers 152 are secured to equalizing yoke by shoulder bolts 153. The rollers 152 provide a rolling rest for the pipe and are adjustable to meet various pipe sizes.

Upper carriage 81 is provided with two raised portions which each have two drilled holes to receive capscrews 154 which secure thereto two similar lugs 155. These lugs are bored to receive slidably an extended shaft 156 and a thumb screw 157 which is used to secure shaft 156 in any desired extended position.

An adjustable holding bracket 158 (see Figures 1 and 3) is arranged to slide on shaft 156 and is secured in any position by means of thumb screw 159. Bracket 158 is bored to receive the torch holder assembly 160 which is clamped in split bracket ear by wing nut 161. Torch holder 160 is bored to slidably receive the round torch body 160A (see Figure 3) to which is fastened a gear rack 162. Hand wheel 163 has gear teeth cut in its stem to mesh with gear ratchet 162, so as handwheel 163 is rotated the torch 9 is raised or lowered. Torch 10 is mounted in an identical manner on extended shaft 164 which is anchored to support casting 26 in boss 164 and secured by set screw 166. Note that torch 9 is mounted on upper carriage 81 while torch 10 is mounted on stationary casting 26. This enables the two torches to cut simultaneously; one a development cut and the other a straight cut off.

The cutting tips 167 and 168 are, for example, beveling tips to cut the pipe off at 45° angle so it is prepared properly for the welding operation. A straight tip or any other type of cutting tip could be substituted to obtain different cuts.

Figure 3:
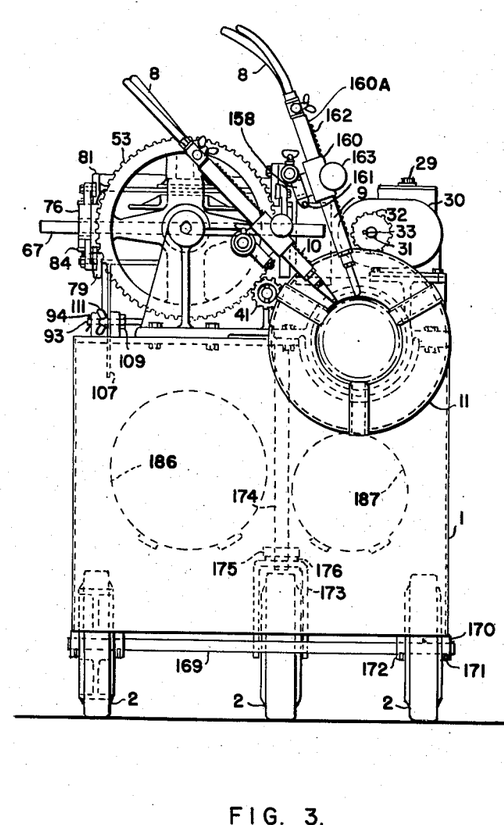
Figure 3 is a rear elevation looking directly at the end opposite the drawbar.

The particular carrier 1 used in the illustration has two of its wheels 2 mounted on shaft 169 located near rear or chuck end of machine (see Figure 3). Shaft 169 is carried by two lugs 170 projecting downward from carrier 1 and tapped to receive each a set screw 171 to secure shaft 169 against rotation and end movement. Two set screw collars 172 are used against the inside hub of wheels 2 to retain wheels from side play. The single front or steering wheel 2 (see Figures 3 and 4) is held by a forked steering yoke 173 which has an upwardly extending shaft 174 held rotatably near the lower end by support bar 175 and at the top by an aperture in top plate of carrier 1. A thrust washer 176 is inserted between support bar 175 and yoke 173.

The front steering wheel is supported on through bolt 177 which serves as the axle and is secured by locking nut 178. The steering yoke 173 contains a forwardly extending portion 179 which provides a hinge point for drawbar 3 (see Figure 1). The hinge pin 180 is in the form of a through bolt secured by locking nut 181 (see Figure 2). The drawbar 3 consists of spaced bars 182 extending upward and pierced near the upper extremity to receive a handle 183 which in turn acts as a pivot for universal link 184 which is used when the apparatus is being towed by a vehicle to connect to vehicle towing hitch.

The carrier 1 is reinforced by two webbed plates 185 (see Figure 1) which each contain a large circular opening 186 and a smaller circular opening 187 (see Figure 4) to permit entrance of the acetylene and oxygen tanks. Similar openings in alignment are cut in front of carrier 1 and runner bars 188 extend from front to rear of carrier 1 to provide a supporting slide for the tanks to permit easy handling.

Figure 9:
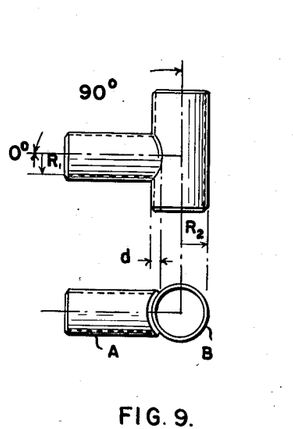
Figure 9 is a typical right angle pipe joint which the machine will cut.

To describe the operation of the machine, reference is made to Figure 9 of the drawings. In order to cut pipe A to fit snugly against pipe B in a typical right angle intersection, pipe A must be cut with a curvature which will vary with every different size of pipe and angle intersection. The only data required to set the machine for any type or size of joint are four dimensions, namely: 1st, the size of pipe A to be cut with $R_1$, representing the inside radius of the pipe; 2nd, the size of pipe B represented by $R_2$ which is the outside radius of the pipe; 3rd, the angle of intersection as represented by angle 0°, Figure 9, which is read from line perpendicular to center line of pipe B, and 4th, the relative offset of the center lines of the pipes A and B which is zero inches in Figures 9 and 10 and represented by letters "OF" in Figure 11.

In setting the machine to cut pipe A of Figure 9 the pipe is placed in the three jaw chuck and gripped securely for rotation. Torch 9 is set to cut the curve and torch 10 is set to cut the straight beveled cut off. The setting of the space between the torches determines the length of pipe A after cutting. Radius $R_1$ of pipe A is set by offsetting developing lever 55, Figure 1, by amount of radius $R_1$ which is read directly on the machine from scale 58 which is stamped on developing gear 53. Radius $R_2$ of pipe B is set by moving pivot point at point of lever 65, Figure 1, a distance $R_2$ from the center of rotation. This distance is read directly on scale 70 stamped on link 65 and is read at point 68 where link 65 enters sleeve 66, Figure 5. The angle of intersection is set by dial 127 which moves with angle setting quadrant 123 and in this particular intersection the angle of intersection is 0° so quadrant 123 is set parallel and in alignment with slot 112 of plate 88. Again this setting is read directly by degree markings on dial 127 to correspond to a punched marker 129 on upper carriage 81 as shown in Figure 2. The angle quadrant 123 is held securely in position by clamping action of clamping nut 128 shown clearly in Figure 6. Multiplying lever 130 is set with link 133 set at degree marking corresponding with dial setting 127 at all times. The function and operation of this will be described later. Wing nut 136 secures link 133 rotatably at any position along slot in lever 131 and in this particular development it is set at 0° to correspond with dial 127 in front of shoulder screw 131 in Figure 5. Since the center lines of pipes A and B are in the same plane the offset is 0" so that the center line of intermediate carriage 76, and consequently the center of rotation of link 65 is in the same plane as the center line of developing gear 53 and is read directly from scale 95 which shows "0" on scale in line with lower edge of groove in lower carriage 79, Figure 1.

The machine has now received its four dimensional settings and is ready to cut the pipe joint.

The torches are lighted and positioned above the pipe for preliminary heating. The power unit is adjusted for proper speed of rotation to give correct cutting speed to torches by means of control handle 29 on variable speed drive 26. When proper local heat on pipe is attained for cutting the oxygen blower is turned on in torch 9 to begin the cut and the switching control lever 32 is swung to forward position to begin powered rotation of chuck and related apparatus.

The oxygen blower is then turned on in torch 10 to begin cutting slightly delayed from torch 9. This move is obvious for if torch 10 were started first the pipe would be cut off completely and drop to the ground before the development cut was completed by torch 9.

To describe the action of the developing mechanism, gear 53, is synchronized in rotation with chuck 11 through means of idler gears. Developing lever assembly 55 is rotated with gear 53 so pivot pin 63 describes a circle in plane PP Figure 5. This motion carries traversing fork assembly 116 a distance $R_1$ to each side of center position during rotation as well as moving complete carriage 76 forward and rearward by amount of "$d$", Figure 9. It will, therefore, be seen that as carriage 76 moves forward and rearward it carries torch 9 a likewise amount so as to cut pipe A to fit snugly against pipe B. The angle quadrant 123 and multiplying lever 130 had no action in this development so intermediate carriage 76, intermediate plate 88 and upper carriage 81 travelled together in unison and had no movement relative to each other. The complete motion in this development imparted to the torch 9 was derived by the action of lever 55 and link 65. It will be seen that positioned as shown in Figure 5, link 65 extends downward at an angle. As lever 55 is rotated clockwise pin 63 approaches the center line of carriage 76 and in so doing link 65 is brought to a horizontal position forcing carriage 76 back on rollers 84 in slots of lower carriage 79. The movement is in the amount of $d$ in Figures 9, 10, and 11 and varies for every different setting of $R_1$ and $R_2$. It is obvious that $R_2$ must always be larger than $R_1$, or a complete revolution of lever 55 would be impossible. However, two pipes of like size may be joined because $R_1$ is set to the inside radius of the pipe while $R_2$ is set to the outside radius so that the difference in setting of $R_1$ and $R_2$ in like size pipe will be the thickness of the pipe wall.

Figure 10:
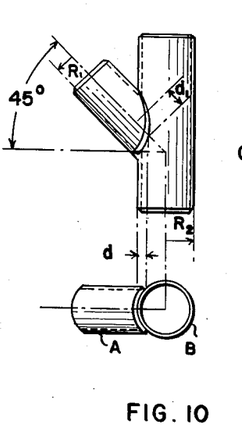
Figure 10 is a similar joint with an intersecting angle of 45°.

To cut a joint as in Figure 10, assuming the pipes A and B remain the same size, $R_1$ and $R_2$ are the same as in Figure 9 and therefore, lever 55 and link 65 need not be moved but remain as set up in Figure 9. However, the angle of intersection is 45° from perpendicular so dial 127 must be set at 45° so angle "$a$" is 45°, Figure 2. Multiplying lever 130 is set to correspond so pivot point of link 133 is set to pivot at 45° marking on lever 130. Link 134 is adjustably set by wing nut 143, Figure 6, so that lever 130 is substantially parallel with shaft 67 at start of intersection. The setting is now complete to cut pipe A, Figure 10.

The action of lever 55 and link 65 give an identical motion to carriage 76 as in above described development of Figure 9. However, since angle quadrant 123 is set at an angle there is a relative movement produced between carriage 76 and upper carriage 81 caused by bearing 119 being carried to either side of center a distance $R_1$ by action of traversing forks 116 to impart a forward and rearward movement of upper carriage 81 relative to intermediate carriage 76. The action of this motion if it were imparted to the torch alone would result in a cut similar to a 45° angle cut made in a hack saw or band saw. In other words, the action of quadrant 123 alone would make an angle cut on pipe A at 45° so that pipe 9 would fit at 45° against a flat plane. Therefore, if quadrant 123 will cut a pipe to fit against a plane at the desired angle and lever 55 and link 65 will cut a pipe to fit against another pipe then by adding these two motions a resultant motion is obtained which cuts a pipe intersecting another pipe at the selected angle. The action of quadrant 123 and lever 155 with link 65 is not enough however to give a completely accurate cut. The action of multiplying lever 130 must also be entered to get a correct development.

In Figure 10 it will be noted that the action of lever 55 and link 65 develops a motion of distance $d$. This motion develops the curvature of the outside radius $R_2$ of pipe B against pipe A. However, as pipe A is chucked in the machine the torch moves in a direction along the center line of pipe B so that to get a proper fit-up the torch would have to move a distance $d_1$ which is in proportion to the sine of the angle of intersection, 45° in this case. Therefore, distance $d_1$ is always $d$ divided by the sine of the angle of intersection or $d$ is always $d_1$ times the sine of the angle of intersection. From this simple mathematical derivation multiplying lever 130 is laid out so that in angle intersections the movement of pivot 131 is multiplied in imparting its movement to plate 88 through medium of link 133. Lever 130 is pivoted on intermediate carriage 76 which is actuated by lever 55 and link 65 to develop motion of distance $d$. One end of lever 130 has a pivot point at 140, Figure 5, which in turn is connected pivotally to lower carriage 79 by means of link 134. Therefore, when each cut is started lever 130 is set to be substantially as shown in Figure 5 and pivot point 140 remains motionless during development since it is connected to lower carriage 79 which is stationary. Carriage 76 is moved carrying with it pivot point 131 of lever 130. If the angle of intersection is 0° as in Figure 9 then link 133 is set at 0° on lever 130 and moves intermediate plate 88 at same speed and distance as carriage 76. However, if the angle of intersection is other than 0° link 133 is set on lever 133 to correct angle setting and link 130 will impart a movement to carriage 88 which is proportionately greater than the movement of carriage 76 and is always in the same direction so as to multiply the motion of carriage 76. This multiplied motion must be transmitted to upper carriage accurately and permit the movement derived from angle quadrant 123 to be added thereto to give final correct movement to upper carriage 81 and torch 9. This is accomplished through medium of roller assembly 113 and 114 sliding or rolling transversely in slot 112 of intermediate plate 88 to permit side movement a distance $R_1$ to either side of center while at the same time moving forward and rearward along with intermediate plate 88. An elongated slot at the end of each forked plate 115, Figure 5, of traversing fork assembly 116 permits forward and rearward motion of roller 113 as fork assembly 116 carries the roller assembly 113 and 114 transversely to one side then the other in direct relation with developing lever 55. Therefore, roller assembly 113 and 114 has correct multiplied motion in angle intersections to correspond with distance $d_1$, Figure 10. At the same time, this movement takes place, the roller is free to be actuated transversely by fork plates 115 which actuates upper carriage to give a movement which would cut pipe A to fit against a flat plane. Obviously angle quadrant 123 is carried forward and rearward by action of rollers 113 and 114 while at the same time added motion is given because roller 113 and 114 move transversely to give further motion to upper carriage 81 through action of bearing 119 in slot 122 of quadrant 123. As stated previously this motion only results when quadrant 123 is set at an angle to slot 112. If quadrant 123 is parallel to slot 112 there will be no movement imparted to upper carriage 81 except that of rollers 113 and 114 forward and rearward. The transverse movement of the rollers then has no effect on movement of carriage 81 at 0° intersections.

The above description discloses the operation of the angle cutting mechanism for the junction as illustrated in Figure 10. A straight perpendicular intersection was described in Figure 9. The above two figures illustrated the transposition of three dimensions to the machine setting namely the inside radius of pipe A, the outside radius of pipe B, and the angle of intersection. There is one more dimension which must be considered and that is the relative offset of the center lines of pipes A and B as shown by distance "OF" in Figure 11.

Figure 11:
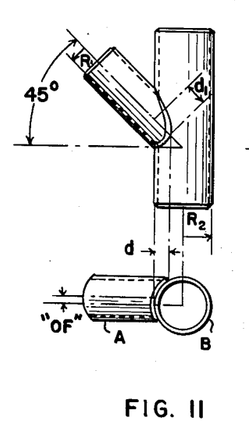
Figure 11 is a joint similar to Figure 10 except that the two pipes have their center lines in offset planes.

The settings of the machine to cut a joint as in Figure 11 is identical to Figure 10 except a setting must be made to allow for offset "OF." This adjustment is made by raising lower carriage a distance "OF" which is read directly from scale 95. This movement is made by loosening wing nuts 111 on links 107 and rotating handwheel 98 which raises parallel support members 90 and 89 through action of screw 99 in trunnion 100. Wing nuts 111 are again tightened when adjustment is made to maintain a rigid support for lower carriage 79. Elevating lower carriage 79 will, of course, offset cross shaft 67 of intermediate carriage 76 with respect to the center of rotation of developing gear 53. This offset will be distance "OF" in Figure 11 and therefore, the action of developing lever 55 and link 65 will be such as to produce a movement to torch 9 to cut pipe A as shown in Figure 11. The action of the angle cutting mechanism is as described with lever 55 and link 65 giving distance $d$ and action of multiplying lever 130 multiplying distance $d$ to $d_1$ and action of rollers 113 and 114 and bearing 119 in slot 122 of quadrant lever 123 producing motion for a straight angle cut, the combination of all movements resulting in the correct finished cut.

The arrangement of the torches 9 and 10 are such that various results can be obtained in cutting pipe joints. As shown in Figure 1 a short pipe length is cut with a developed cut at one end and a straight cut at the other. The length of this joint will vary with the distance between torches 9 and 10. Supporting shaft 136 could be extended considerably and supported by a stand to the floor so that the length of pipe joint cut could be quite great. The two torches 9 and 10 do not have to be operated simultaneously so the development cut could be made first and the pipe then shifted to make the beveled cutoff. The torch 9 can also be made to remain stationary during a cutting operation by disengaging sliding clutch gear 45 from developing gear 53 so that gear 53 remains motionless during cutting and hence there is no movement in the developing mechanism. This produces a straight beveled cut on both ends of the pipe such as pipe B in Figures 9, 10 and 11. This gear shifting is accomplished by means of shifter fork 51 and shifting handle 52, Figure 8. When long lengths of pipe are handled, a floor stand with an adjustable upright containing a roller at the top contacting the pipe must be used to support the overhung lengths of pipe so as to stabilize the machine and minimize strains on the chuck and carrier.

While the above disclosure is one embodiment of the invention many deviations are possible in details of construction and the inventor does not wish to be limited in scope to the exact details disclosed, but avail himself of the full scope of the invention as will hereinafter appear in the appended claims.

Thus by way of example, the tool used might be a welding head in lieu of a torch.

This is a continuation-in-part of my application Serial No. 612,938, filed August 27, 1945, and now abandoned.

What is claimed is:

1. A machine adapted to form the end of a pipe so that it will properly join the cut-out portion of a pipe with which it is to intersect; comprising a base, rotatable means to mount a pipe for rotation about its axis on the base, driving means connected to said rotatable mounting means, a lever having its axis parallel to the axis of the pipe, said lever having one end freely rotatable about the axis of the lever, means connected to said driving means to revolve said lever about an axis parallel to the axis of the pipe at the angular rate of rotation of the rotatable mounting means, a carriage mounted for horizontal movement parallel to the axis of the pipe, a shaft mounted across one end of said carriage, said shaft being free to move along its axis and being free to rotate about its axis, a link lying in a plane perpendicular to the axis of said shaft and secured to said shaft, said link having one end pivotally connected to the rotatable end of said lever and means to secure a tool to said carriage.

2. A machine adapted to form the end of a pipe so that it will properly join the cut-out portion of a pipe with which it is to intersect; comprising a base, rotatable means to mount a pipe for rotation about its axis on the base, driving means connected to said rotatable mounting means, a lever having its axis parallel to the axis of the pipe, said lever having one end freely rotatable about the axis of the lever, means connected to said driving means to revolve said lever about an axis parallel to the axis of the pipe at the angular rate of rotation of the rotatable mounting means, a carriage mounted for horizontal movement parallel to the axis of the pipe, a shaft mounted across one end of said carriage, said shaft being free to move along its axis and being free to rotate about its axis, a link lying in a plane perpendicular to the axis of said shaft and secured to said shaft, said link having one end pivotally connected to the rotatable end of said lever, means to secure a tool to said carriage and means to adjust the elevation of said carriage.

3. A machine adapted to form the end of a pipe so that it will properly join the cut-out portion of a pipe with which it is to intersect; comprising a base, rotatable means to mount a pipe for rotation about its axis on the base, driving means connected to said rotatable mounting means, a wheel connected to said driving means and mounted for rotation in a plane perpendicular to the axis of the pipe at the angular rate of rotation of the rotatable mounting means, a lever secured to said wheel so as to lie perpendicular to the plane in which said wheel rotates, said lever having an end portion freely rotatable about the axis of the lever, a carriage mounted for horizontal movement parallel to the axis of the pipe, a shaft mounted across one end of said carriage, said shaft being free to rotate and free to move along its axis, a link lying in a plane perpendicular to the axis of said shaft and secured to said shaft, said link having one end thereof pivotally connected to the rotatable end of said lever and means to secure a tool to said carriage.

4. A machine adapted to form the end of a pipe so that it will properly join the cut-out portion of a pipe with which it is to intersect; comprising a base, rotatable means to mount a pipe for rotation about its axis on the base, driving means connected to said rotatable mounting means, a lever having its axis parallel to the axis of the pipe, said lever having one end freely rotatable about the axis of the lever, means connected to said driving means to revolve said lever about an axis parallel to the axis of the pipe at the angular rate of rotation of the rotatable mounting means, a carriage mounted for horizontal movement parallel to the axis of the pipe, a shaft mounted across one end of said carriage, said shaft being free to move along its axis and being free to rotate about its axis, a link lying in a plane perpendicular to the axis of said shaft and secured to said shaft, said link having one end pivotally connected to the rotatable end of said lever, a sliding plate mounted for horizontal movement parallel to the movement of said carriage, multiplying lever means connected to said carriage, said sliding plate and said base, said sliding plate having a slot running parallel with said shaft, a second carriage mounted above said plate for movement parallel to the axis of the pipe, a rotatable slotted member above said slot in the sliding plate and adjustably secured to said second carriage, a pin adapted to engage the slot in the sliding plate and said slotted member, a fork encompassing said pin and mounted on said shaft to permit rotation of the shaft independent of the fork, a member engaging said fork and said link to impart the lateral movement of the link to the fork and means to secure a tool to said second carriage.

5. A machine adapted to form the end of a pipe so that it will properly join the cut-out portion of a pipe with which it is to intersect; comprising a base, rotatable means to mount a pipe for rotation about its axis on the base, driving means connected to said rotatable mounting means, a lever having its axis parallel to the axis of the pipe, said lever having one end freely rotatable about the axis of the lever, means connected to said driving means to revolve said lever about an axis parallel to the axis of the pipe at the angular rate of rotation of the rotatable mounting means, a carriage mounted for horizontal movement parallel to the axis of the pipe, a shaft mounted across one end of said carriage, said shaft being free to move along its axis and being free to rotate about its axis, a link lying in a plane perpendicular to the axis of said shaft and secured to said shaft, said link having one end pivotally connected to the rotatable end of said lever, a sliding plate mounted for horizontal movement parallel to the movement of said carriage, multiplying lever means connected to said carriage, said sliding plate and said base, said sliding plate having a slot running parallel with said shaft, a second carriage mounted above said plate for movement parallel to the axis of the pipe, a rotatable slotted member above said slot in the sliding plate and adjustably secured to said second carriage, a pin adapted to engage the slot in the sliding plate and said slotted member, a fork encompassing said pin and mounted on said shaft to permit rotation of the shaft independent of the fork, a member engaging said fork and said link to impart the lateral movement of the link to the fork, means to secure a tool to said second carriage and means to adjust the elevation of said carriages and said sliding plate.

6. A machine adapted to form the end of a pipe so that it will properly join the cut-out portion of a pipe with which it is to intersect; comprising a base, rotatable means to mount a pipe for rotation about its axis on the base, driving means connected to said rotatable mounting means, a wheel connected to said driving means and mounted for rotation in a plane perpendicular to the axis of the pipe at the angular rate of rotation of the rotatable mounting means, a lever secured to said wheel so as to lie perpendicular to the plane in which said wheel rotates, said lever having an end portion freely rotatable about the axis of the lever, a carriage mounted for horizontal movement parallel to the axis of the pipe, a shaft mounted across one end of said carriage, said shaft being free to move along its axis and being free to rotate about its axis, a link lying in a plane perpendicular to the axis of said shaft and secured to said shaft, said link having one end pivotally connected to the rotatable end of said lever, a sliding plate mounted for horizontal movement parallel to the movement of said carriage, multiplying lever means connected to said carriage, said sliding plate and said base, said sliding plate having a slot running parallel with said shaft, a second carriage slidably mounted on said first mentioned carriage, a rotatable slotted member above said slot in the sliding plate and adjustably secured to said second carriage, a pin adapted to engage the slot in the sliding plate and said slotted member, a fork encompassing said pin and mounted on said shaft to permit rotation of the shaft independent of said fork, a member engaging said fork and said link to impart the lateral movement of the link to the fork, means to secure a tool to said second carriage and means to adjust the elevation of said first mentioned carriage.

STEPHAN A. GRUBICH.

References Cited in the file of this patent

UNITED STATES PATENTS

| Number | Name | Date |
| --- | --- | --- |
| 1,923,778 | Douglass | Aug. 22, 1933 |
| 1,928,121 | Anderson | Sept. 26, 1933 |
| 1,963,537 | Tweit | June 19, 1934 |
| 2,057,612 | Formont | Oct. 13, 1936 |
| 2,379,630 | Fall | July 3, 1945 |
| 2,422,338 | Christensen | June 17, 1947 |